United States Patent Office 3,271,399
Patented Sept. 6, 1966

3,271,399
5-ACYLOXYURACILS AND THEIR PREPARATION
George H. Hitchings, Yonkers, and Gertrude B. Elion, Bronxville, N.Y., assignors to Burroughs Wellcome & Co. (U.S.A.) Inc., Tuckahoe, N.Y., a corporation of New York
No Drawing. Filed Feb. 10, 1964, Ser. No. 343,498
2 Claims. (Cl. 260—256.4)

This invention relates to new 5-acyloxyuracils selected from the class consisting of those having the formulae

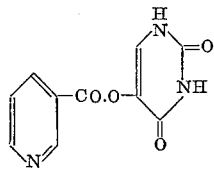

(I)
5-nicotinoyloxyuracil and

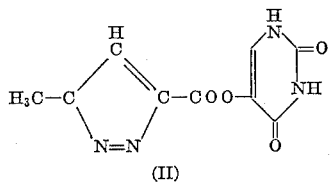

(II)
5-(3-methylpyrazole-5-carbonyloxy)uracil

The compounds of these formulae have been found to be active in the inhibition of antibody formation and thus to be potentially valuable for example in prolonging the survival of transplanted organs and in controlling auto-immune diseases.

As shown by their ability to suppress the formation of haemagglutinins in mice following the injection of tanned red cells, the compounds of Formulae I and II are considerably more potent than related 5-acyloxyuracils, such as 5-acetoxyuracil.

The following experiment illustrates the testing procedure and shows the anti-immune activity of 5-nicotinoyloxyuracil, the compound of Formula I. In these tests, mice are injected intravenously with 0.25 ml. of a 30% suspension of tanned sheep red blood cells, and the compound is administered to the mice in 4 daily doses, beginning on the day of antigen administration. The serum haemagglutinin titre is measured on the 12th day. Activity of the compound is shown by a suppression of the haemagglutinin titre, an index of 0.60 or less being significantly different from the control value of 1.00. (See H. C. Nathan, S. Bieber, G. B. Elion and G. H. Hitchings, "Detection of Agents Which Interfere With the Immune Response," Proceedings of the Society for Experimental Biology and Medicine (1961) 107, 796–799.)

The values of the index obtained with various intraperitoneal doses of 5-nicotinoyloxyuracil and 5-acetoxyuracil are shown in the following table.

| Compound and dose (mg./kg.) | Index | No. of deaths and total No. of mice |
|---|---|---|
| 5-Nicotinoyloxyuracil: | | |
| 10 | 0.72, 0.65, 0.76 | 0/15 |
| 30 | 0.43, 0.59, 0.49 | 0/15 |
| 100 | 0.25, 0.30 | 0/10 |
| 5-Acetoxyuracil: | | |
| 50 | 0.70, 0.72, 0.73, 0.75 | 0/20 |
| 100 | 0.57 | 0/5 |
| 200 | 0.49, 0.43 | 0/10 |
| 400 | 0.35 | 0/5 |

Moreover the compounds of Formulae I and II potentiate the activities of antimetabolic 6-substituted purines such as 6-mercaptopurine when used in combination with them. This is illustrated by the values of the index obtained with various combinations of 5-nicotinoyloxyuracil and 6-mercaptopurine, shown in the following table.

| 5-Nicotinoyloxyuracil, mg./kg. | 6-Mercaptopurine, mg./kg. | | | |
|---|---|---|---|---|
| | 0 | 8.33 | 25 | 75 |
| 0 | 1.00 | 0.85 | 0.81 | 0.43 |
| 10 | 0.76 | 0.64 | 0.47 | |
| 30 | 0.59 | 0.55 | 0.37 | |

The 5-acyloxyuracils of Formula I may be produced by the reaction of isobarbituric acid (5-hydroxyuracil) with an acyl chloride of Formula R.COCl in the presence of a proton acceptor, for example an alkali metal hydroxide or an organic base such as pyridine.

5-nicotinoyloxyuracil may also be produced by the reaction of 5-hydroxyuracil with a reactive nicotinoyl amide such as is formed from nicotinic acid and 1,1'-carbonyldiimidazole or a similarly reactive urea analogously derived from a related heterocyclic base such as pyrazole, triazole, or tetrazole. Carbon dioxide is evolved and the reactive nicotinoyl amide (for example 1-nicotinoylimidazole) can then be reacted in the same vessel with 5-hydroxyuracil. After a short period of heating and the addition of water, the desired 5-nicotinoyloxyuracil may be recovered in about 80% yield (calculated on nicotinic acid), and the product could thus be obtained analytically pure without purification.

The products of the invention may be presented as pharmaceutical formulations, singly or in combination with other active ingredients. It may advantageously be presented in discrete units, such as tablets, capsules, cachets, ampoules or suppositories, each containing a predetermined amount of the compound. It may also be presented as a powder or granules, as a solution or suspension in an aqueous, non-aqueous or emulsified liquid, or as an ointment. For parenteral use, the formulations must be sterile and are presented in sealed containers. The formations of this invention may be made by any of the methods of pharmacy, and may include one or more of the following accessory ingredients: diluents, solutes, buffers, flavoring, binding, dispersing, surface-active, thickening, lubricating and coating materials, preservatives, antioxidants, bacteriostats, suppository and ointment bases, and any other acceptable excipients.

The following examples illustrate the invention.

EXAMPLE 1

*5-nicotinoyloxyuracil*

To a cold solution of 5 g. (0.039 mole) of 5-hydroxyuracil in 34 ml. of 2.5 N sodium hydroxide was added slowly, with stirring, a solution of 11.0 g. (0.078 mole) of nicotinoyl chloride in 20 ml. of tetrahydrofuran. When all of the acid chloride had been added (15 min.), the pH value of the solution was 5. The mixture was chilled and filtered. The precipitate (9.3 g.) was leached with 100 ml. of boiling water to remove nicotinic acid or unchanged 5-hydroxyuracil. The insoluble residue was then purified by solution in 80 ml. of hot N-methylpyrrolidone, precipitation by the addition of 100 ml. of water to the hot solution and chilling. The 5-nicotinoyloxyuracil (4.4 g., 47% yield) decomposes at 295–305° C.

EXAMPLE 2

*5-nicotinoyloxyuracil (alternate method 1)*

A mixture of 5 g. (0.039 mole) of 5-hydroxyuracil, 9.2 g. (0.065 mole) of nicotinoyl chloride and 50 ml. of dry pyridine was heated under reflux conditions for 3 hours. The pyridine was removed under reduced pressure and the residue was treated with 50 ml. of water. After chilling the crude product was collected (4 g.) and recrystalized from water, with the use of decolorizing charcoal. The purified product (0.6 g., 6.5% yield) was identical with that formed in Example 1 above.

EXAMPLE 3

*5-nicotinoyloxyuracil (alternate method 2)*

3.03 gm. (0.0246 M) of nicotinic acid were dissolved in 30 ml. of dry dimethylformamide. To this solution were added 4 gm. (0.0246 M) of N,N'-carbonyldiimidazole. The reaction mixture was warmed to about 40° to complete the reaction. 125 mg. of the sodium salt of 5-hydroxyuracil were added followed by the addition of 3.15 gm. (0.0246 M) of 5-hydroxyuracil suspended in 50 ml. of dimethylformamide. The reaction mixture was warmed until most of the material had dissolved and then decanted into 400 ml. of water and allowed to stand overnight at room temperature. The 5-nicotinoyloxyuracil was filtered and dried at 50°.

Yield=4.45 gm. (78% theoret.), M.P. 305 dec.

EXAMPLE 4

*5-(3-methylpyrazole-5-carbonyloxy)uracil*

2.52 gm. (0.02 M) of 5-carboxy-3-methylpyrazole were dissolved in 40 ml. of dry dimethylformamide. 3.5 gm. (0.022 M) of N,N'-carbonyldiimidazole were added and warmed to 40° to complete formation of the acid imidazolide. To this solution were added 50 mg. of the sodium salt of imidazole, followed by addition of 2.56 gm. (0.02 M) of 5-hydroxyuracil. The reaction mixture was heated until all material had dissolved and then poured into 250 ml. of water. The aqueous solution was allowed to stand at room temperature overnight. The 5-(3-methylpyrazole-5-carbonyloxy)uracil was filtered and dried at 50°.

Yield=3.2 gm. (68% theoret.), M.P. 287–290° dec.

What we claim is:
1. 5-nicotinoyloxyuracil.
2. 5-(3-methylpyrazole-5-carbonyloxy)uracil.

References Cited by the Examiner
UNITED STATES PATENTS

| | | | |
|---|---|---|---|
| 3,051,625 | 8/1962 | Rao | 167—78 |
| 3,051,626 | 8/1962 | Rao | 167—78 |
| 3,105,077 | 9/1963 | Muller et al. | 260—256.4 |
| 3,138,596 | 11/1964 | Kloosterman et al. | 260—256.4 |

HENRY R. JILES, *Acting Primary Examiner.*

M. E. O'BRIEN, *Assistant Examiner.*